UNITED STATES PATENT OFFICE.

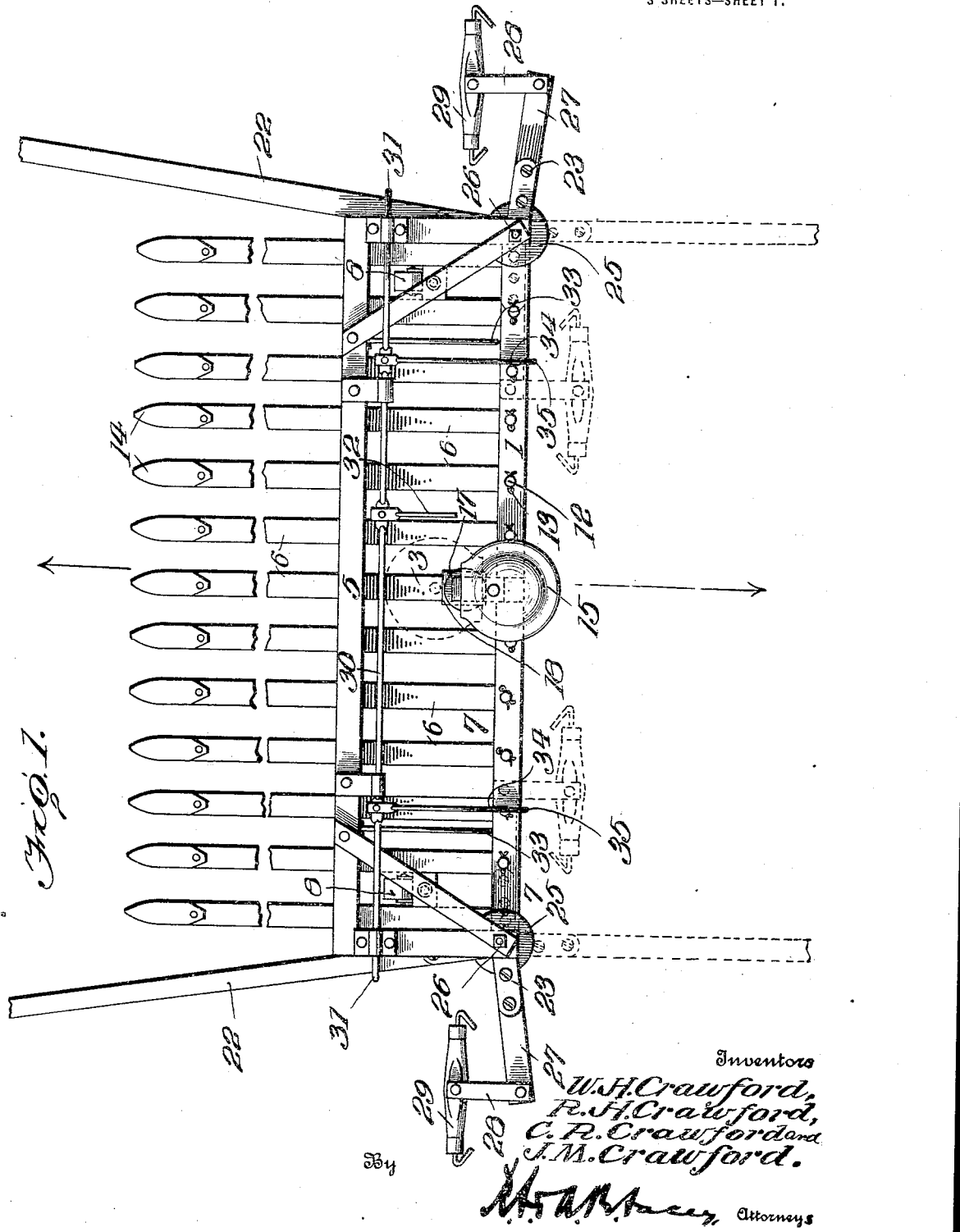

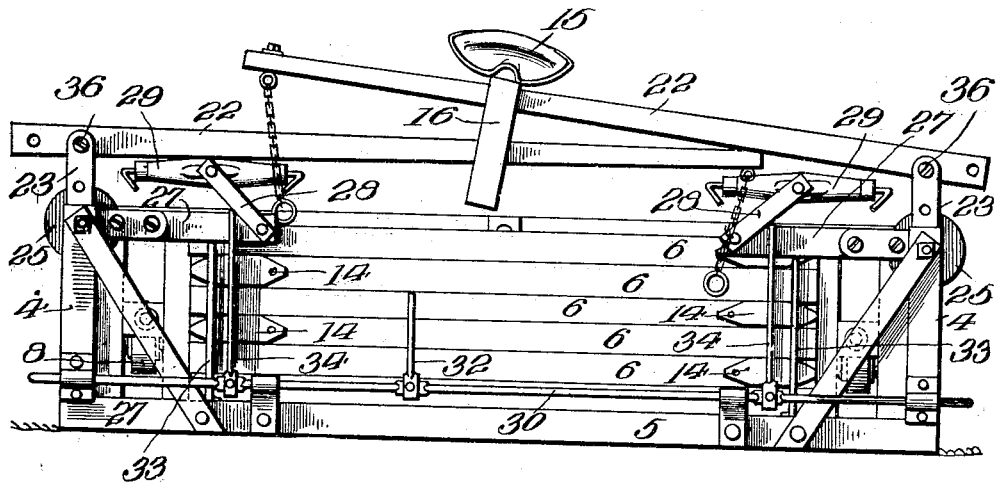
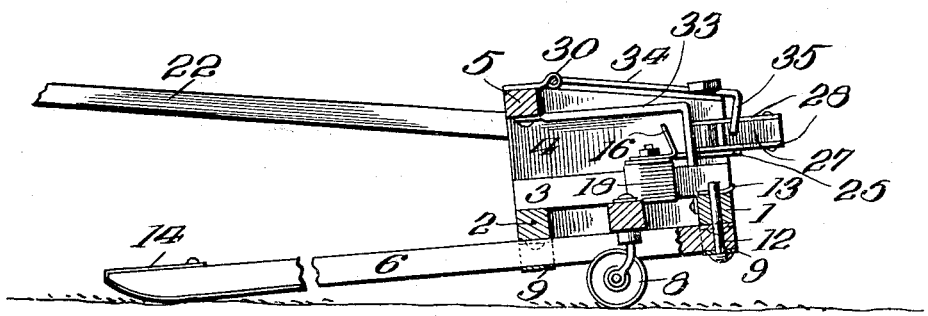

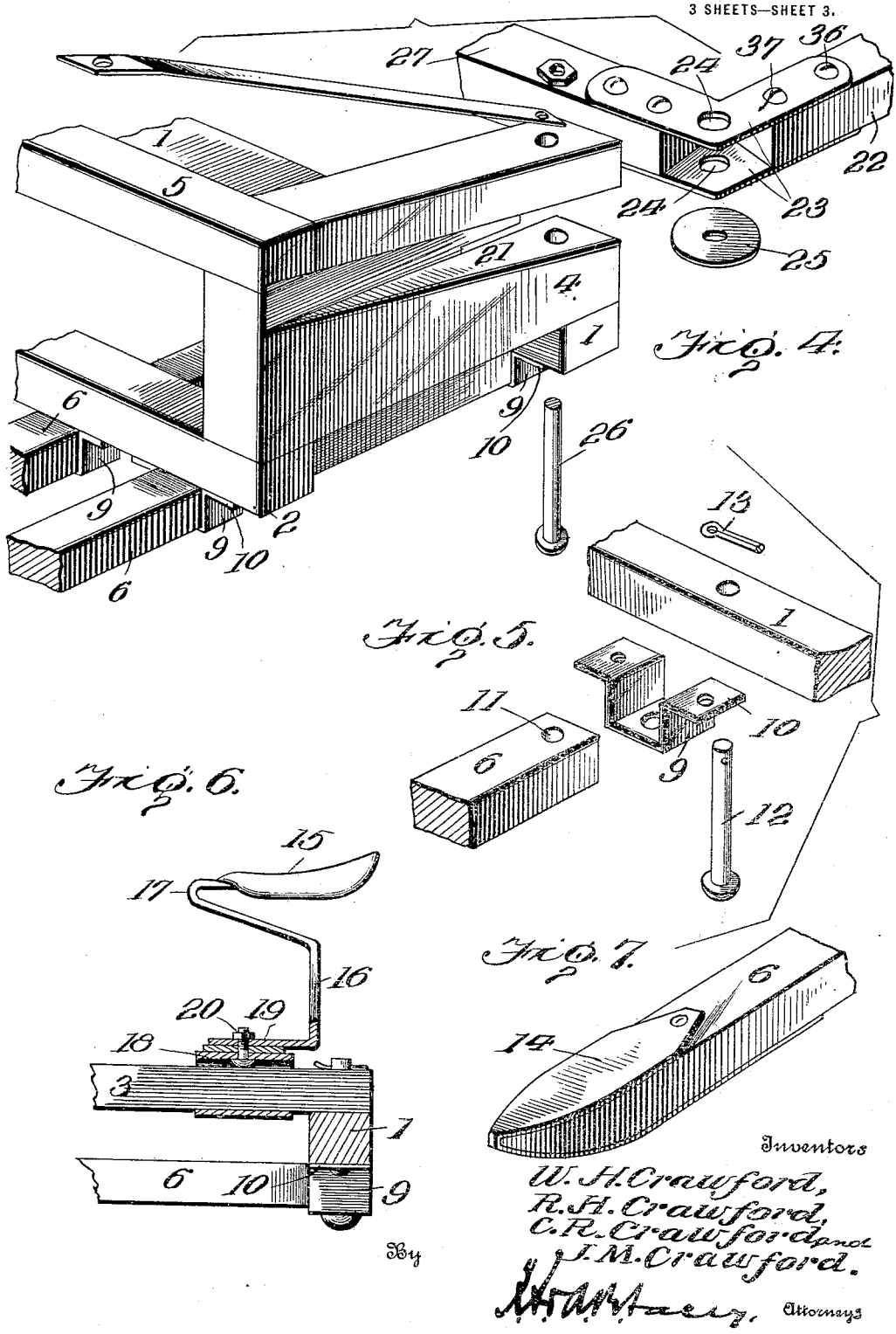

WILLIAM H. CRAWFORD, RICHARD H. CRAWFORD, CHARLES R. CRAWFORD, AND JERRY M. CRAWFORD, OF ROSEMOND, ILLINOIS.

HAY-GATHERER.

1,205,975.      Specification of Letters Patent.      Patented Nov. 28, 1916.

Application filed June 2, 1915. Serial No. 31,735.

*To all whom it may concern:*

Be it known that we, WILLIAM H. CRAWFORD, RICHARD H. CRAWFORD, CHARLES R. CRAWFORD, and JERRY M. CRAWFORD, citizens of the United States, residing at Rosemond, in the county of Christian and State of Illinois, have invented certain new and useful Improvements in Hay-Gatherers, of which the following is a specification.

Our invention relates to hay gatherers, and has for one object the provision of a hay gatherer so constructed that it may be readily stored within a small space when not in use.

A further object of the invention is to provide a novel mounting for the guide poles, and also to provide novel means for retaining said poles in the position in which they may be set.

A still further object of the invention is to provide novel means for permitting reversal of the direction of travel of the machine, and another object of the invention is to provide a novel method of securing the teeth to the frame.

These stated objects of the invention, and such other objects as will appear incidentally from the following description, are attained in mechanism of the type illustrated in the accompanying drawings, and the invention consists in certain novel features which will be particularly pointed out in the claims following the description.

In the annexed drawings: Figure 1 is a plan view of a hay gatherer embodying our present improvements; Fig. 2 is a rear elevation showing the device arranged for storage; Fig. 3 is a transverse vertical section taken approximately in the plane of a ground wheel but omitting the longitudinal bars from which said wheel is hung. Fig. 4 is a detail perspective view showing the manner in which the guide poles and the means connected therewith for supporting the draft devices are mounted upon the frame; Fig. 5 is a detail perspective view of the means for maintaining the teeth upon the frame; Fig. 6 is a detail view showing the manner of mounting the seat; and Fig. 7 is a detail perspective view of the point of a tooth.

In carrying out our invention, we employ a pair of lower cross bars 1 and 2 which are connected at about their centers by a longitudinal bar 3 having the seat mounted thereon. At their ends, the cross bars 1 and 2 are connected by end plates or standards 4, and between the upper front corners of said end plates we extend a cross bar 5. The teeth 6 are supported by the lower cross bars, and longitudinal bars 7 similar in all respects to the bar 3 are also connected to said cross bars to provide a support for ground wheels or rollers 8. The particular manner in which these ground wheels or rollers are mounted is immaterial, and in practice they will ordinarily be mounted in swiveled yokes so that they may turn freely and permit the device to conform to any deviations from a straight line which may be due to irregular traveling of the draft animals or to peculiarities of the surface over which the machine is being operated.

The teeth 6 project longitudinally forward from the front cross bar, and they are supported upon the cross bars by loops or brackets 9 which are secured to the under sides of the said cross bars, as shown most clearly in Figs. 3 and 4. The said loops consist of depending central stirrups or tooth-engaging portions and flanges or lugs 10 at the upper sides of the said stirrups, fastening devices, such as screws or rivets, being inserted upwardly through the said lugs into the cross bars to secure the loops or brackets in place. Each tooth is inserted in alined loops or brackets upon the front and rear cross bars, and the rear end of each tooth is provided with an opening 11 through which a bolt or securing pin 12 is inserted upwardly. The said bolt or pin passes also through the loop or bracket on the rear cross bar and through the said cross bar so as to retain the tooth within the loop and serve as an abutment to prevent the tooth being driven rearwardly beyond the rear cross bar from any cause while the machine is in use. The securing pin or bolt 12 projects above the rear cross bar, and a cotter pin or other retainer 13 is engaged with the pin immediately above the said cross bar so as to prevent accidental withdrawal of the pin. The tooth is not secured positively in the loop on the front cross bar but merely rests in said loop, and it will be thus seen that the withdrawal of a single pin or bolt will permit a tooth to be removed. The ease with which a tooth may be withdrawn will be found very advantageous should it be necessary to substitute a new tooth for a broken tooth and also when it is desired to arrange the device in a barn in such manner that it may occupy the smallest possible space. The teeth are tapered at their front ends by having their side faces converging and also having their under sides beveled or rounded off so as to extend upwardly to meet their tops. The front ends of the teeth are shod, as shown in the drawings, by having a metal plate or sheath 14 secured upon the tops of the teeth and carried over the front extremities thereof and then downwardly under the bottom of the tooth. The edges of this sheath are shaped to conform to the tapered formation of the sides of the tooth, and the use of unnecessary material is thus avoided so that the cost of manufacture is reduced. This sheath serves to protect the wooden body of the tooth at its front end against excessive wear from contact with the ground and also serves to resist the wear of the top of the tooth through the engagement of the same with the hay.

The seat 15 is carried by a standard 16 which, as shown in Fig. 6, is doubled on itself immediately in advance of the seat, as shown at 17, and then extends downwardly and rearwardly under the seat. The lower extremity of the standard is bent sharply forward and extends over a supporting bracket or sleeve 18 which is slidably mounted upon the seat supporting bar 3. The forwardly extending lower portion 19 of the standard is pivotally connected to the supporting sleeve 18 by a bolt 20 which is fitted within said sleeve and projects through the top of the same and the extension 19 of the standard, as shown. It will be readily seen that the seat may be moved forwardly or backwardly and also turned so as to face the front or rear of the machine as circumstances may require. When the machine is at work gathering hay, the seat will be turned so that the driver faces the front ends of the gathering teeth, but, if the load is to be discharged, the seat is turned about the pivot 20 so as to face the rear of the machine and the draft animals are then driven in the reverse direction, our improved hay gatherer being especially designed to permit draft animals to be driven in either direction without any necessity of backing the animals when it is desired to discharge a load of gathered hay.

The end blocks or plates 4 are provided in their outer faces with grooves or longitudinal recesses 21 which extend upwardly from the rear sides or ends of the blocks to the front ends thereof, as shown most clearly in Fig. 4. The guide poles 22 have upper and lower angle plates 23 secured to their rear ends, and these angle plates are provided with openings 24 at the junctions of their side arms to receive a pivot which will be presently mentioned. These angle plates are fitted within the rear ends of the grooves or recesses 21, and a washer or wear plate 25 is inserted between the lower angle plate and the lower wall of said recess so as to minimize the wear. A pin or bolt 26 is inserted upwardly through the ends of the rear cross bar, the end plate, the washer 25 and the openings 24 in the angle plates 23 so as to pivotally secure the said angle plates within the recesses 21. When the guide poles are arranged, as shown in Fig. 1, so as to extend forwardly from the machine, the rear ends of the said poles with the portions of the angle plates 23 secured thereto will lie in the said longitudinal grooves or recesses 21. A lever or supporting arm 27 is secured between the angle plates 23, and to the free end of this arm or lever, we pivotally secure the straps or clevis members 28, a whiffletree 29 being pivotally mounted between the opposite ends of said straps or clevis members. It will be understood, of course, that a guide pole is mounted at each rear corner of the frame and that a whiffletree is connected with each guide pole in the manner just described so that a draft animal may be arranged at each side of the machine and driven over the field so as to haul the machine through the hay and carry the load to the barn. To retain the guide poles in the position shown in Fig. 1, we provide a locking rod 30 which is preferably a rock shaft journaled in suitable bearings upon the front cross bar 5 and the end blocks 4 and having its ends turned down to form cranks or locking arms 31 adapted to bear against the outer sides of the guide poles and thereby hold them in the recesses 21, as will be readily understood. This locking rod 30 is equipped with an operating lever 32 at a point where it may be easily grasped by the driver upon the seat 15.

When the parts are arranged as shown in full lines in Fig. 1, the machine is driven forward so as to cause the teeth 6 to ride under the loose hay and cause the same to move rearwardly over the teeth as the machine progresses. To prevent the hay thus taken up passing out at the rear end of the frame, we provide the guards or stop arms 33 which may conveniently be wires or light rods secured at their front ends to the upper cross bar 5 and having their rear ends turned down and secured to the rear cross bar 1, as shown most clearly in Fig. 3. It will be readily understood that the downturned portions of these guards will prevent the hay passing out at the rear of the frame and will retain the same within the frame and upon the teeth.

If it be desired to discharge the gathered hay, the draft animals are not backed as is now ordinarily the practice, but the rod or shaft 30 is rocked so as to release the end cranks or locking arms 31 from the guide poles, after which the animals are merely driven around so that they will face toward the rear of the machine. As the whiffletrees are pivotally mounted between the clevis members or straps 28, and these straps 28 are in turn pivotally secured upon the supporting arms 27, the animals may, if desired, be reversed without also reversing the guide poles 22. This, however, will necessitate the driver first dismounting and disconnecting the neck yoke chains, and we, therefore, prefer to reverse the guide poles by manipulation of the rod or shaft 30 as described, permitting the guide poles and the parts connected thereto to swing to the position shown in dotted lines in Fig. 1 about the pivotal supports 26. The seat 15 will, of course, be reversed and the team may then be driven over the field in the direction opposite to that just traveled so that the machine will be drawn from under the gathered load which will be left upon the field to be subsequently formed into a stack.

The rod or shaft 30 is also equipped with rearwardly extending locking arms 34 which have their rear ends turned downwardly to form hooks 35 adapted to engage over the arms 27, when the device is arranged as shown in dotted lines in Fig. 1, and thereby hold the parts in the said position so that the draft will be applied to the frame of the machine and cause travel of the same instead of merely swinging the arms 27 about their pivotal connections with the frame. These hooks 35 may be disengaged from the arms 27 by rocking the shaft or rod 30, as will be readily understood.

Upon reference to Figs. 2 and 4, it will be noted that the guide poles 22 are connected to the angle plates 23 by two bolts. The bolts 36 nearer the ends of said plates are intended to be permanently engaged in the plates and the poles, but it is intended to have the bolt 37 readily removable so that, when desired, the poles may be swung about the bolts 36 as pivots and thereby folded against the whiffletrees or the arms 27 to permit storage of the machine in a small space. This disposition of the poles is illustrated in Fig. 2. When it is desired to store the machine, it is driven to the place of storage, after which the teeth are removed and the frame then turned over so as to rest upon its front side. The teeth are then piled within the frame, as is clearly shown in Fig. 2, after which the bolts 37 are removed and the guide poles swung over the frame, as shown. Before the teeth are piled within the frame, the seat and its standard are, of course, removed, and after the guide poles are folded into the position illustrated, the seat is engaged over the upper poles, as shown in said figure. It will thus be seen that the machine may be stored within a very small space.

From the foregoing description, it will be readily seen that we have provided a machine of very simple construction which may be driven in either direction and very easily reversed so as to be withdrawn from its work. It is not necessary for the driver to dismount in order to discharge a load, and all complicated systems of controlling levers and dumping mechanism are dispensed with. The guide poles will be effectually held in either position in which they may be set so as to properly perform their intended functions and yet may be instantly released so as to be turned to the opposite position when such adjustment is necessary or desirable. The gathering teeth may be removed in a very few minutes so that the labor incident to storing the machine is minimized and the facility with which the machine may be brought within a small space will be found advantageous in transportation. The manner of using the machine and its many advantages are believed to be evident from the foregoing description.

Having thus described the invention, what is claimed as new is:—

1. A hay gatherer comprising a frame having vertical end plates provided with longitudinal grooves in their outer faces, guide poles pivotally mounted upon the frame at the rear ends of the grooves and adapted to seat in said grooves and be supported by the lower walls of the same, draft devices connected with the rear ends of the guide poles, and means upon the frame for retaining the said guide poles in said grooves.

2. A hay gatherer comprising a frame, fingers mounted on said frame, guide poles pivotally mounted at their rear ends upon the frame, lateral arms connected with said guide poles, draft devices carried by said arms, and locking mechanism on the frame having end members to engage around the said guide poles and retain them in a forwardly projecting position and rearwardly extending members to engage around the said arms and thereby retain the guide poles in a rearwardly projecting position.

3. A hay gatherer comprising a frame, gathering teeth mounted on said frame, guide poles pivotally mounted upon the frame at the ends thereof, lateral arms connected with said guide poles, draft devices carried by said arms, a rock shaft mounted on and extending across the frame, lateral locking arms at the ends of said shaft adapted to engage the guide poles when said poles extend forwardly, and hooks carried by said rock shaft and projecting rearwardly therefrom to engage over the said arms when the guide poles are in a rearwardly extending position.

4. A hay gatherer comprising a frame having front and rear cross bars, loops secured rigidly to and depending from the cross bars, the loops on one cross bar being alined with the loops on the other cross bar, teeth inserted in alined loops, and fastening devices inserted through the loops on the rear cross bar and through the rear ends of the teeth engaged in said loops, the said teeth resting loosely in the loops on the front cross bar.

5. A hay gatherer comprising end plates provided in their outer faces with grooves extending upwardly from rear to front, front and rear cross bars extending between the lower corners of said end plates, a cross bar extending between the upper front corners of the said plates, teeth carried by and projecting forwardly from the lower cross bars, guide poles pivoted at the rear ends of the grooves in the end plates and adapted to seat in said grooves, supporting arms connected with the rear ends of the poles and disposed at an angle thereto, draft devices carried by the said arms, a rock shaft mounted on the upper cross bar and having lateral arms at its ends adapted to engage around the guide poles and retain them in said grooves, and hooks extending rearwardly from the rock shaft between the ends of the same to engage around said lateral supporting arms when the guide poles are swung inwardly.

In testimony whereof we affix our signatures.

WILLIAM H. CRAWFORD. [L. S.]
RICHARD H. CRAWFORD. [L. S.]
CHARLES R. CRAWFORD. [L. S.]
JERRY M. CRAWFORD. [L. S.]

Copies of this patent may be obtained for five cents each, by addressing the "Commissioner of Patents, Washington, D. C."